(12) United States Patent
Murray (10) Patent No.: US 7,942,635 B1
(45) Date of Patent: May 17, 2011

(54) TWIN SPOOL ROTOR ASSEMBLY FOR A SMALL GAS TURBINE ENGINE

(75) Inventor: Stephen E. Murray, Port St. Lucie, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 853 days.

(21) Appl. No.: 11/903,556

(22) Filed: Sep. 21, 2007

Related U.S. Application Data (60) Provisional application No. 60/963,084, filed on Aug. 2, 2007.

(51) Int. Cl.
*F04D 29/20* (2006.01)

(52) U.S. Cl. ............... 416/126; 416/201 R; 416/244 R; 416/244 A; 416/174; 415/142; 415/229

(58) Field of Classification Search .............. 416/201 R, 416/244 R, 24 A, 174, 124, 126, 128, 244 A; 415/142, 229
See application file for complete search history.

(56) References Cited

U.S. PATENT DOCUMENTS

| | | | | |
|---|---|---|---|---|
| 3,925,979 A * | 12/1975 | Ziegler | ......................... | 415/176 |
| 5,237,817 A * | 8/1993 | Bornemisza et al. | ......... | 415/196 |
| 5,454,222 A | 10/1995 | Dev | | |
| 5,526,640 A | 6/1996 | Brooks et al. | | |
| 6,942,451 B1 * | 9/2005 | Alexander et al. | ............ | 415/119 |
| 7,748,209 B1 * | 7/2010 | Schopf et al. | ............... | 60/39.08 |

* cited by examiner

*Primary Examiner* — Igor Kershteyn
(74) *Attorney, Agent, or Firm* — John Ryznic (57) ABSTRACT

A small twin spool gas turbine engine with a hollow inner rotor shaft having solid shaft ends and an outer rotor shaft having a cylindrical portion on the compressor end that forms a forward bearing support surface and a turbine rotor disk on the turbine end that forms a aft bearing support surface. The inner rotor shaft includes solid shaft ends that project out from the cylindrical portion of the outer shaft on one end and out from the turbine rotor disk on the other end. An inner bearing housing is secured on the solid shaft ends of the inner rotor shaft. A threaded nut on the inner rotor shafts ends provide a compressive load to the inner bearing housings which results in a tension preload to the inner rotor shaft solid ends so that the bearing assemblies for the forward and aft ends of the twin spools do not become lose from the engine operation.

14 Claims, 11 Drawing Sheets

TWIN SPOOL ROTOR ASSEMBLY FOR A SMALL GAS TURBINE ENGINE

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is herein incorporated by reference.

This application is also related to U.S. application Ser. No. 11/903,553 filed on Sep. 21, 2007 and entitled HIGH SPEED ROTOR SHAFT FOR A SMALL TWIN SPOOL GAS TURBINE ENGINE; and related to U.S. application Ser. No. 11/903,555 filed on Sep. 21, 2007 and entitled HIGH SPEED ROTOR SHAFT AND TURBINE ROTOR DISK ASSEMBLY; and related to U.S. application Ser. No. 11/903,554 filed on Sep. 21, 2007 and entitled HIGH SPEED ROTOR SHAFT AND COMPRESSOR ROTOR DISK ASSEMBLY.

GOVERNMENT LICENSE RIGHTS

This invention was made with Government support under Contract No. W31P4Q-05-C-R003 awarded by the US Army. The Government has certain rights in the invention.

BACKGROUND OF THE INVENTION

1. Field of the Invention

The present invention relates generally to a small twin spool gas turbine engine, and more specifically to a twin spool rotor shaft assembly for a small twin spool gas turbine engine.

2. Description of the Related Art Including Information Disclosed Under 37 CFR 1.97 and 1.98

A gas turbine engine is a very efficient power plant and is used to power aircraft such as a commercial or military aircraft or an unmanned aero vehicle (UAV). The PW4000 series engine made by Pratt & Whitney Aircraft Group is a large commercial turbofan engine with a dual-shaft (twin spool) and high bypass ratio front fan. This engine produces 60,000 pounds of thrust and weighs 9,200 pounds dry. It is a very efficient engine. A twin spool engine has about twice the efficiency of a single spool engine and therefore is used when efficiency is an important factor.

Recent developments in small unmanned aircraft, such as a UAV, have led to the use of small gas turbine engines to power these small aircraft. The more efficient the engine is in the UAV, the longer will be the loiter time. Small single spool gas turbine engines have been around for years to power small radio controlled planes or even a UAV such as a cruise missile or a video surveillance aircraft. With the demand for longer loiter times, a more fuel efficient gas turbine engine is desirable.

It has been common in the art of gas turbine engine design to scale down larger engines to the size needed. A small UAV only requires a few hundred pounds of thrust to power the aircraft. One major problem in the design of small gas turbine engines is scaling the larger engine down to the smaller size. A larger engine can only be scaled down so far before design problems start to surface, such as problems with the critical rotation speed of the shaft becoming lower than the operational speed of the shaft. As the size of the engine decreases, the rotational speed of the rotor shaft must increase in order to retain the high overall efficiency for a gas turbine engine. As the rotor shaft speed increases, rotor dynamic issues can become a major problem. A large gas turbine engine such as the PW4000 series engine cannot be scaled down below a certain size before the rotor dynamics and natural frequency problems start to cause problems. The low speed rotor shaft in the PW4000 series engine can be scaled down only so far before the bending mode (third mode) of the rotor shaft coincides with the natural frequency of the shaft. This is referred to in rotor dynamics as the critical speed. At critical speed, a rotating shaft would break apart from the high bending stresses developed. The bending displacement would theoretically be infinite without adequate damping of the bearings. Engineers attempt to design rotor shaft systems to operate below the critical speed to avoid rotor dynamic caused problems. Thus, the original design for a rotor shaft used in the larger prior art gas turbine engine would not function at the smaller size because the shaft operating speed would be larger than the critical speed and therefore making the smaller scaled down engine inoperable.

In a twin spool gas turbine engine, a low pressure fan or compressor and a low pressure turbine are rotatably attached to the inner or low speed rotor shaft. A high pressure compressor and high pressure turbine are rotatably attached to the outer or high speed rotor shaft. Each shaft is rotatably supported by bearings on the shaft ends. The natural frequency of a rotating shaft is directly proportional to a ratio of the stiffness to the mass of the shaft. Thus, the natural frequency of the rotating shaft can be increased by either increasing the stiffness of the shaft, decreasing the mass of the shaft, or both.

If the shaft is lengthened and thus the distance between the bearings, the natural frequency will be lowered. Thus, to produce a small fuel efficient gas turbine engine useful for a UAV or other small aircraft with a thrust less than 300 pounds, a new design is required for the inner and the outer rotor shafts to make such an engine operational. The inner and outer rotor shafts in a twin spool gas turbine engine requires a new design for each shaft since the prior art twin spool engines cannot be scaled down to this level without rotor dynamics problems occurring that limit the size of the shaft.

U.S. Pat. No. 5,454,222 issued to Dev on Oct. 3, 1995 and entitled SMALL GAS TURBINE ENGINE HAVING ENHANCED FUEL ECONOMY discloses a gas turbine engine having twin spools that has a smaller size and lower weight than existing turbine engines having the same power (at the time of the Dev invention). The core engine has a diameter of about 0.35 meters (about 14 inches) that operates at about 54,000 rpm. As can be seen from the figures in the Dev patent, the inner or low speed rotor shaft is a straight solid shaft while the outer rotor shaft is somewhat curved to conform to the radial compressor and turbine on the shaft. The twin spool engine of the Dev patent (a typical of the prior art twin spool gas turbine engines) cannot be scaled down any further because the rotor shafts would have to operate at higher speeds which would then produce the rotor dynamics problems discussed above.

It is an object of the present invention to provide for a small twin spool gas turbine engine.

Another object of the present invention is to provide for a twin spool rotor shaft assembly in a small gas turbine engine.

Another object of the present invention is to provide for a twin spool rotor shaft assembly for a small gas turbine engine having a hollow inner shaft with a preload applied to the ends of the hollow inner shaft in order to prevent the shafts ends from loosening during engine operation.

Another object of the present invention is to provide for a twin spool rotor shaft assembly for a small gas turbine engine with a cooling air passage from the high pressure outlet to the rim cavity forward of the low pressure turbine in order to limit the injection of hot gas.

Another object of the present invention is to provide for a twin spool rotor shaft assembly for a small gas turbine engine with minimal axial spacing between the low speed rotor shaft bearings in order to maximize the critical speed for the low speed rotor shaft.

BRIEF SUMMARY OF THE INVENTION

A twin spool rotor shaft assembly for a small gas turbine engine in which the low speed shaft is a hollow shaft with bearing support ends at a minimal axial spacing in order to provide for a critical speed well above the engine operating speed and therefore make such a small twin spool gas turbine engine possible. The low speed shaft is hollow in order to form a rigid inner shaft with an increased natural frequency. The hollow inner shaft is made from two sections that are orbital welded together. Orbital welding limits the amount of weld material that typically would build up inside the hollow shaft. Once the hollow shaft sections are joined, the inside cannot be accessed to remove material for balancing. The outer rotor shaft is open on the aft end to allow for the inner shaft to be assembled within the outer shaft. The outer shaft is attached to the turbine rotor disk by a snap ring.

The inner shaft ends are supported by bearings that are mounted on a supporting guide vane assembly in the forward end of the engine and by second stage vanes on the aft end of the engine. The inner shaft includes sleeve members that are concentrically mounted over the forward and aft ends of the inner shaft and provide a preload tensile force to the inner solid shaft ends so that the twin spool rotor shaft assembly does not loose preload during engine operation.

The inner and outer rotor shafts are shaped to meet the rotor dynamic requirements. The space between the inner and the outer shafts also forms a cooling air passage from the compressor outlet to the rim cavity to prevent hot gas flow from the turbine from passing through the aft bearings.

DETAILED DESCRIPTION OF THE INVENTION

Figure 1:
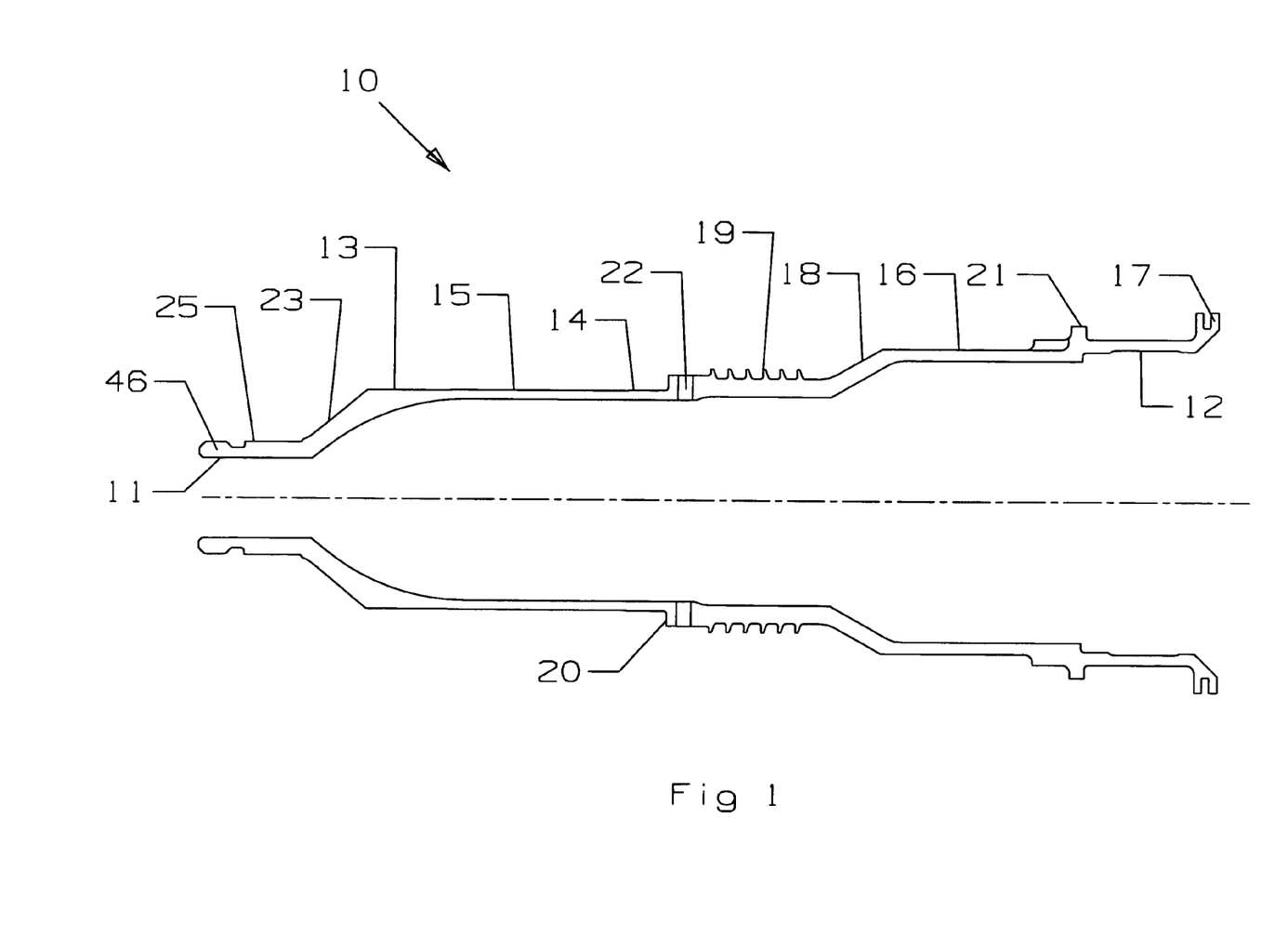
FIG. 1 shows a cross section view of the outer rotor shaft of the present invention.

The present invention is a twin spool rotor assembly for a small twin spool gas turbine engine. The high speed or (or outer) rotor shaft 10 is shown in FIG. 1 and includes a forward end 15 on which a compressor rotor disk 31 is secured and an aft end 16 on which a turbine rotor disk 32 is secured. The forward end 15 of the shaft 10 includes a cylindrical portion with a small diameter opening 11 centered on the rotational axis of the shaft 10 and in which the low speed (or inner) rotor shaft 51 of the engine passes through. An outer surface 25 of the central opening 11 forms a bearing support surface for the forward end of the outer shaft 10. The aft end of the outer shaft 10 includes a large opening 12 sized to allow for the low speed rotor shaft 51, which is hollow and therefore has an enlarged middle portion compared to the ends, to be inserted into the outer shaft 10 during assembly of the twin spools.

The outer shaft 10 includes on its forward end 15 two annular surfaces 13 and 14 on which the compressor rotor disk 31 is press fitted to the outer shaft 10. The forward annular surface 13 has a smaller diameter than the aft annular surface 14 so that the compressor rotor disk can be assembled onto the shaft 10. The outer shaft 10 includes an axial abutment surface 20 to axially position the compressor rotor disk 31 on the outer shaft 10. The compressor rotor disk 31 has an interference fit with the outer shaft 10 to produce a very tight radial fit against the forward annular surface 13 and a not-so-tight fit against the aft annular surface 14. The compressor rotor disk 31 is heated to a high enough temperature to allow the compressor disk 31 to be assembled onto the outer rotor shaft and against the axial abutment stop 20. The fit against the aft annular surface 14 serves mainly to prevent the compressor disk from vibrating during engine operation. The tight fit against the forward annular surface 13 provides a structure to secure the compressor disk 31 to the outer shaft 10. The tight radial fit is used to prevent relative rotation between the compressor disk 31 and the outer shaft 10.

The outer shaft 10 includes a number of radial holes 22 just forward of the knife edges 19 to allow for cooling air to flow between the twin spool shafts as described below. The present invention uses about 12 radial holes 22 in the outer shaft 10 to provide for the proper amount of cooling air to flow from the compressor outlet through the annular space between the two rotor shafts.

The compressor rotor disk 31 is formed with a forward extending axial portion that includes an annular groove 38 facing radial outward that is used to remove the compressor rotor disk off of the outer rotor shaft 10. The forward extending portion also forms an axial abutment surface against the forward outer rotor shaft bearing 33. The forward extending portion includes an inner conical shaped surface that conforms to the size and shape of the transition piece 23 of the outer rotor shaft 10. The compressor rotor disk 31 is made from a material having a lower coefficient of thermal expansion than does the outer rotor shaft 10 in order that the tight fit between the shaft 10 and the disk 31 does not loosen during the engine operation and allows torque to be transmitted without slipping.

The outer shaft 10 includes a number of knife edges 19 extending radially outward from the shaft. These knife edges form a seal on the diffuser assembly. The aft end of the outer shaft 10 includes a larger diameter section 16 with a cone shaped transition portion 18 formed between the forward smaller diameter section 15 and the larger diameter aft section 16. The shape of the forward 15 and aft 16 sections allow for the hollow low speed shaft 51 to fit within the confines of the outer rotor shaft 10. A smaller conical shaped section 23 connects the smaller diameter aft section 15 of the outer shaft to the cylindrical section 46 with the small central opening 11. The cylindrical section 46 forms the inner bearing support surface for the forward end of the outer rotor shaft 10. The inside surface of the small conical shaped transition section 23 is parabolic shaped to conform to the outer adjacent surface of the inner shaft 51. An annular ring 21 is formed on the aft section of the outer shaft 10 and is used to balance the outer shaft 10 by machining off material from this ring 21. The annular ring 21 is also used to disassemble the outer rotor shaft 10 from the turbine rotor disk 32. The aft end of the outer rotor shaft 10 includes an annular groove 17 in which a snap ring 61 is placed and further described below.

Figure 2:
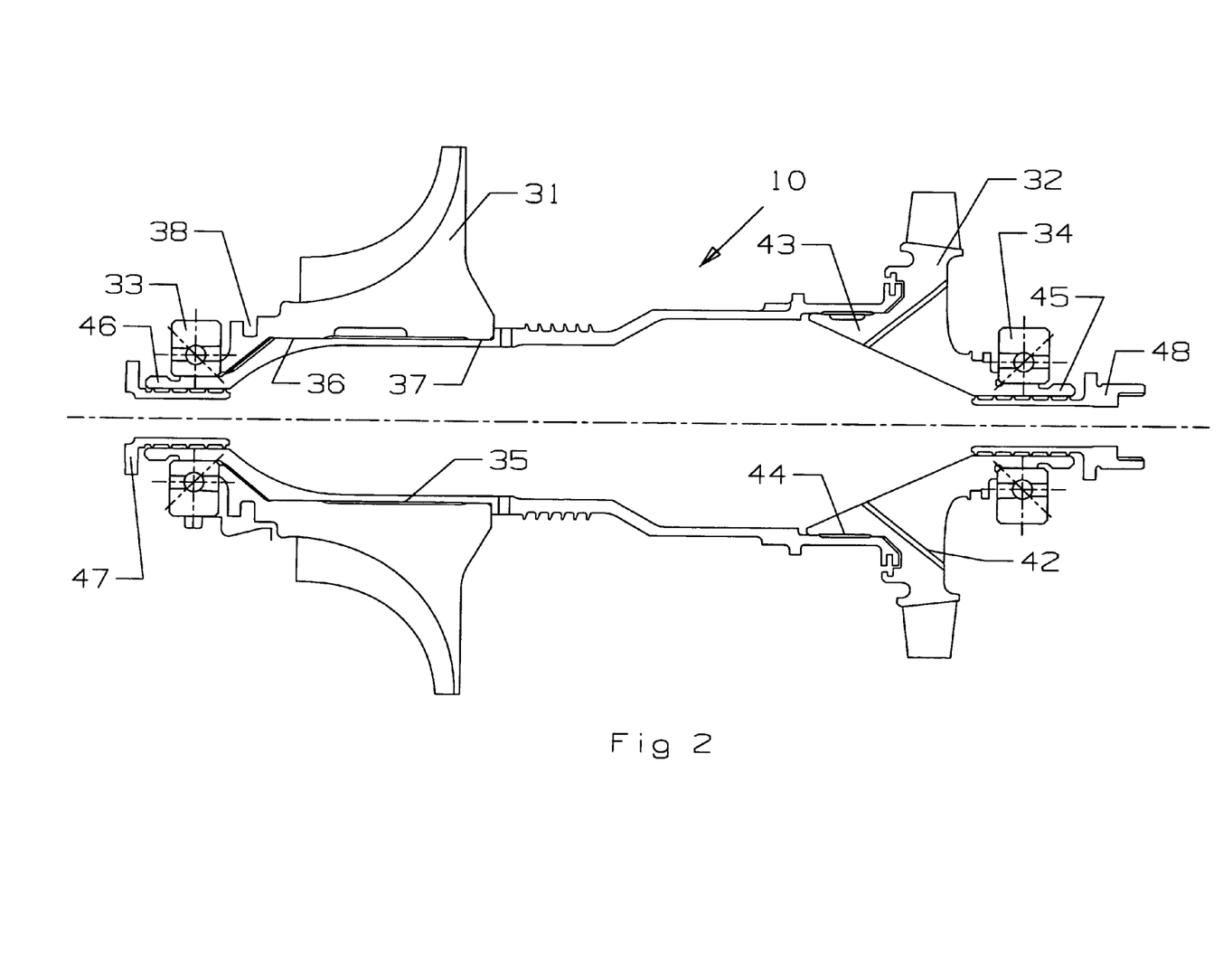
FIG. 2 shows a cross section view of the high pressure compressor and the high pressure turbine rotor disks connected to the outer rotor shaft of the present invention.

FIG. 2 shows the compressor rotor disk 31 and the turbine rotor disk 32 secured onto the outer rotor shaft 10. The outer rotor shaft 10 is supported by a forward bearing 33 and a rearward bearing 34 through the turbine rotor disk 32. The compressor rotor disk 31 is press fitted onto the forward section 15 of the outer rotor shaft 10. An annular groove 35 is formed on the inner surface of the compressor rotor disk 31 to separate a forward fitting surface 36 and an aft fitting surface 37. The annular groove 35 in the compressor rotor disk 31 is also used for detail balancing by removing material. The forward fitting surface 36 forms a tight radial fit with the forward annular surface 13 on the outer shaft 10, and the aft fitting surface 37 forms a normal fit with the aft annular surface 14 of the outer shaft 10. The tight fit formed between the forward surfaces 13 and 36 allows for the transmission of torque between the compressor disk 31 and the outer rotor shaft 10. The radial fit between the aft surfaces 14 and 37 functions mainly to prevent the compressor disk 31 from vibrating during engine operation.

The abutment surface 20 on the outer shaft 10 forms an axial stop position for the compressor disk 31. A forward inner bearing housing 47 fits within the forward bore of the outer rotor shaft 10 and an aft inner nearing housing 48 fits within the aft bore of the turbine rotor disk 32. The inner bearing housings 47 and 48 serve multiple functions. Both inner bearing housings support the inner race of bearings 33 and 34. Both inner bearing housings provide sealing capabilities with the use of knife edge seals. Bearing housing 47 also provides flow passages that allow cooling air to pass under forward outer shaft bearing 33. Inner bearing housing 48 allows cooling air to flow under aft outer shaft bearing 34. Inner bearing housing 48 also has a removal feature for removal of the bearing housing from the inner rotor shaft 51.

The turbine rotor disk 32 is made from Inconel 713 and has the turbine blades formed into the rotor disk to form an integral bladed rotor or an IBR. The turbine disk is an IBR in order to reduce the leakage across the turbine disk and eliminate the need for attachments or cover plates in order to reduce the weight. In the preferred embodiment, the turbine rotor disk 32 is cast instead of forged. The casting process includes the hot isostatic press (HIP) in the order of 20,000 psi to reduce the amount of voids left in the cast piece. Voids or porosity can result in a weaker structure or lead to cracks that can damage the disk. During the HIP process, the casting is heated up to a temperature just below melting temperature, and the high pressure gas will remove voids formed during the casting process.

The compressor disk 31 is heated in order to expand the forward and aft fitting surfaces 36 and 37 prior to sliding the compressor disk 31 onto the outer shaft 10. This produces a very tight fit when the compressor disk 31 has cooled. The compressor rotor disk 31 is removed from the forward end of the outer shaft 10 by placing a pulling tool into an annular groove 38 formed on the forward end of the compressor rotor disk 31. The forward fitting surface 36 forms a radial stop and the aft fitting surface 37 forms an axial stop 20 for the compressor disk 31. The annular groove 38 in the compressor rotor disk is axial aligned with the annular fitting surfaces 36 and 37 so that the pulling force from the tool will be aligned with the tight fitting surfaces to provide for a smooth and easy removal of the disk from the shaft without undue compressive forces being applied.

Figure 10:
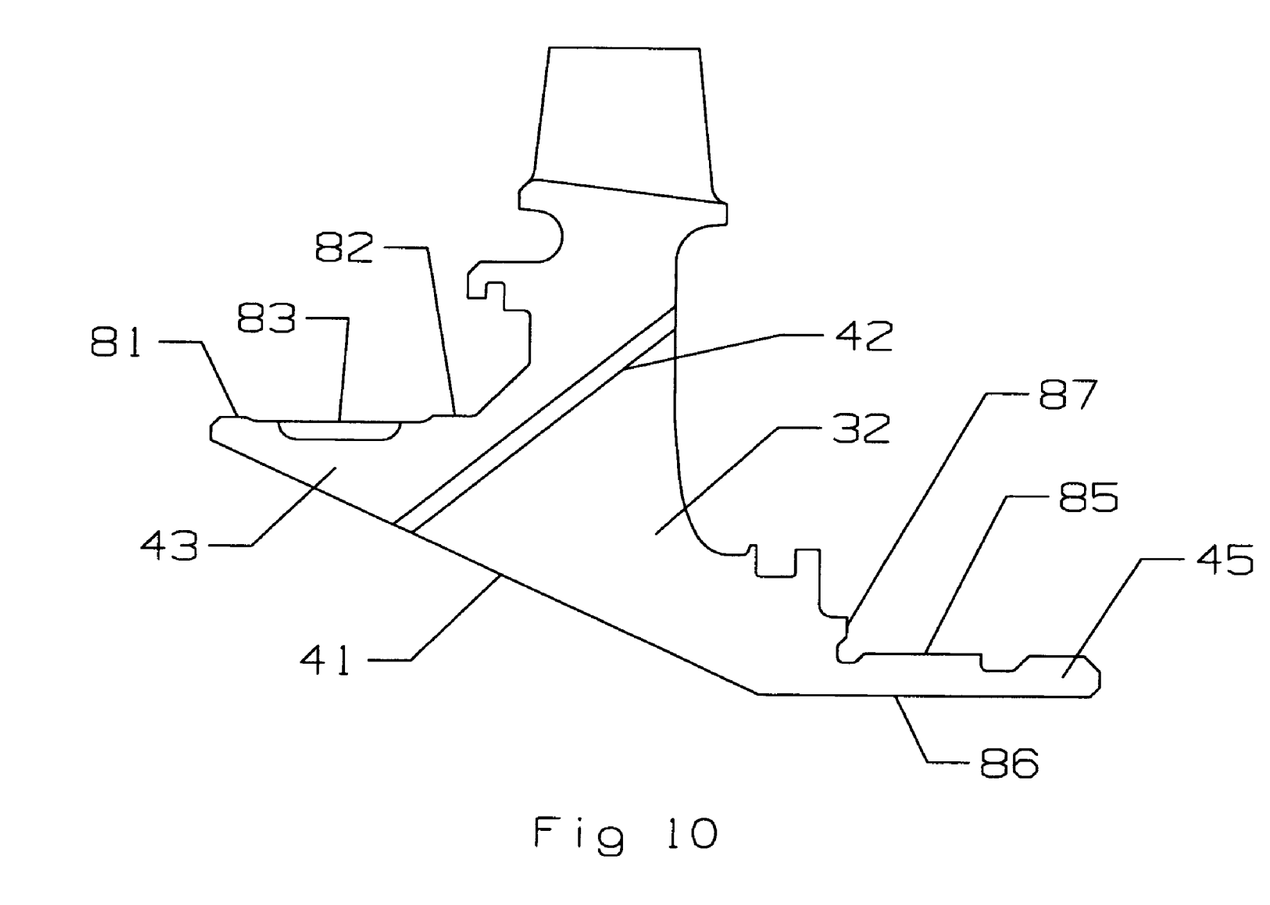
FIG. 10 shows a schematic view of the forward central opening of the turbine rotor disk of the present invention.
Figure 11:
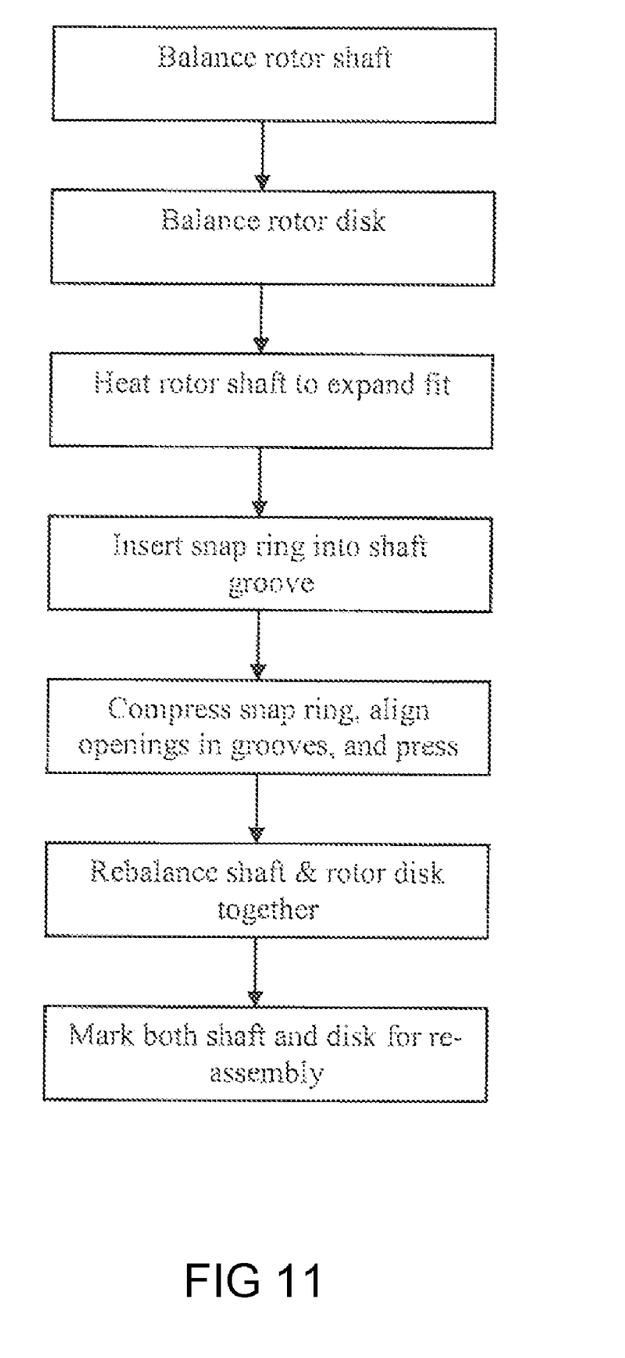
FIG. 11 shows the process steps for assembling the outer rotor shaft to the high pressure compressor rotor disk of the present invention.

The aft end of the outer shaft 10 is attached to the turbine rotor disk 32 by a snap ring 61 that fits within annular grooves formed on the outer shaft 10 and on the turbine disk 32. The turbine rotor disk 32 includes a cone shaped opening 41 on the forward end that is centrally located within the turbine disk 32. The cone shaped opening 41 is shaped and sized to fit the inner rotor shaft 51 with a minimal amount of clearance of about 0.030 inches between the two shafts. This minimal amount of clearance allows for the outer shaft 10 to be at a minimum diameter in order to keep the operating speed below the critical speed of the outer shaft. The turbine rotor disk 32 includes an axial forward extending portion 43 (see FIGS. 2 and 10) with an annular outer surface that includes a forward fitting surface 81 and an aft fitting surface 82 separated by an annular groove 83. Surfaces 81 and 82 to produce a tight fit with the inner surface of the outer rotor or outer shaft 10. The forward fitting surface 81 has a slightly less diameter than does the aft fitting surface 82 in order to allow for the turbine rotor disk 31 to be pressed onto the outer rotor shaft 10. The main feature is that the outer rotor shaft can be pressed onto the rotor disk after the outer rotor shaft has been heated to form the loose fit at assembly. The outer shaft 10 is shrink fitted over the turbine disk 32 to produce the tight fit required to hold the outer shaft 10 and turbine disk 32 together. The aft end of the turbine rotor disk 32 includes an axial aft extending portion 45 with a central axial opening 86 to fit the low speed or inner rotor shaft of the twin spool engine and an outer bearing support surface 85. An abutment surface 87 is formed on the axial extending portion 84 to provide for a surface to set the forward axial position of the bearing 34 that will support the turbine rotor disk 32. In order to prevent the tight fit from loosening between the outer rotor shaft and the turbine rotor disk 32 during engine operation, the rotor disk 32 is made from a material that has a larger coefficient of thermal expansion than does the outer rotor shaft ($\alpha r > \alpha s$). Due to differences in thermal expansion, the fit will increase when exposed to high temperatures.

Other means to attach the outer shaft 10 to the turbine rotor disk 32 can be used but with less performance than the preferred embodiment. A number of bolts can be used to attach the annular flange on the aft end of the outer shaft to the turbine rotor disk 32. Also, the outer shaft 10 can be welded to the turbine rotor disk 32. However, the bolt and the weld process would be difficult to remove the outer shaft 10 from the turbine rotor disk 32 in order to replace parts or access the inner rotor shaft.

The turbine disk also includes a number of holes 42 to pass the cooling air from the space between the two shafts and into the aft high pressure turbine rim cavity to purge the hot gas influx and prevent the hot gas flow from reaching the aft bearings. There are around 26 small diameter holes 42 in the turbine disk and about 12 larger diameter holes 22 in the outer shaft 10.

Figure 3:
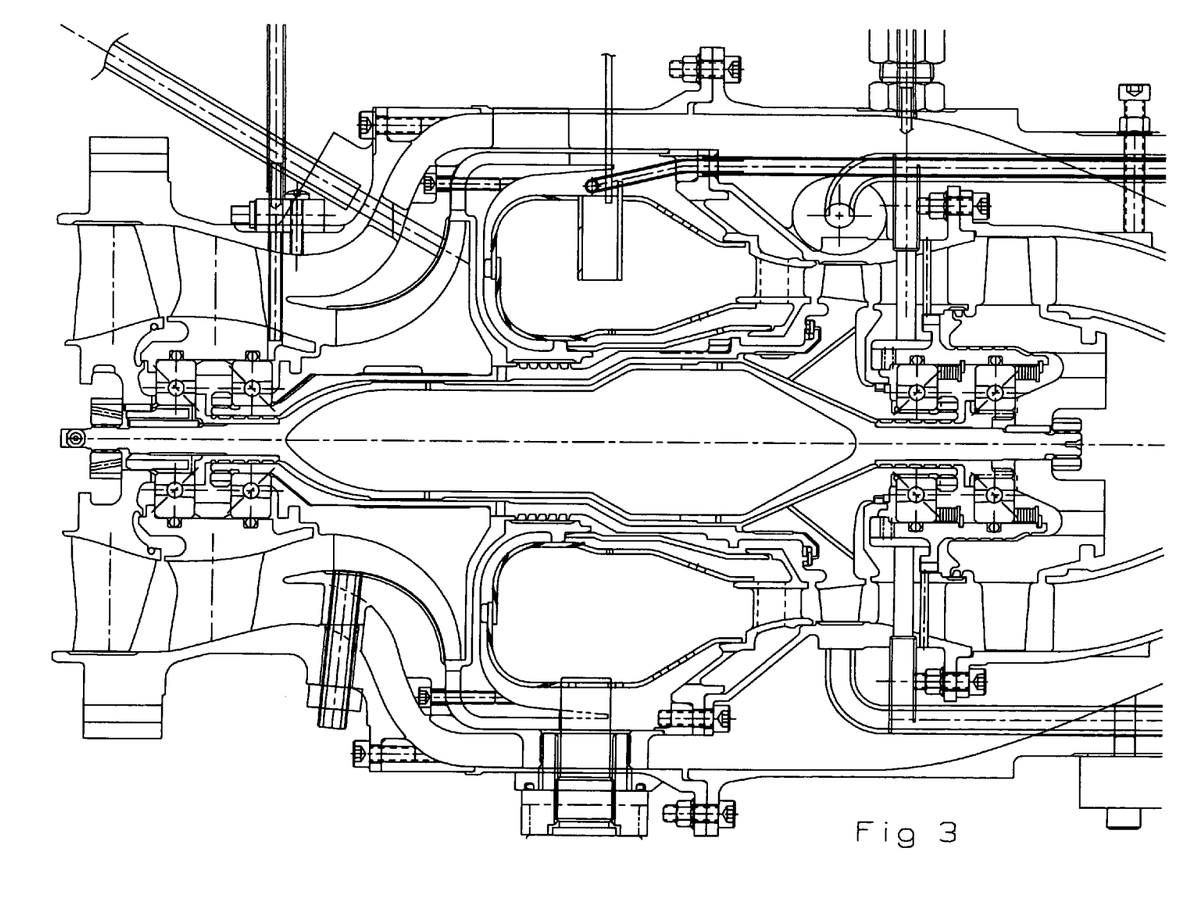
FIG. 3 shows a cross section view of the small twin spool gas turbine engine of the present invention.
Figure 4:
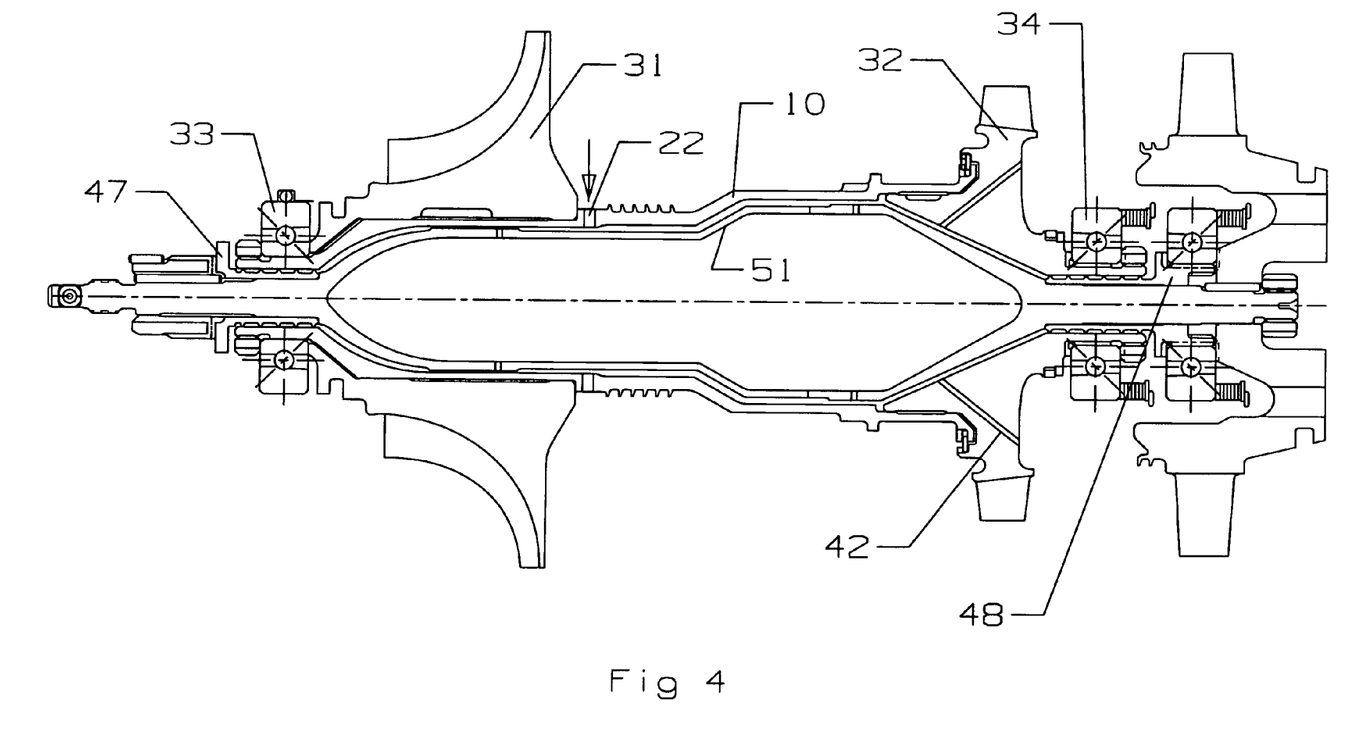
FIG. 4 shows a cross section view of the compressor rotor disk and the turbine rotor disk connected to the outer rotor shaft of the present invention.

FIG. 4 shows the inner shaft 51 and the outer shaft 10 in the assembled position. The compressor rotor disk 31 is secured on the forward end of the outer shaft 10 and the turbine rotor disk 32 is secured on the aft end. The inner rotor shaft 51 is hollow between the solid shaft ends that are supported by bearings. The inner shaft 51 is hollow to allow high speed rotation below the critical speed. As seen in FIG. 3 and FIG. 4, the inner shaft has a hollow central portion with a smaller diameter section in the forward side and a larger diameter section in the aft side of the shaft. This difference in the diameters of the hollow portion is to fit within the available space between the compressor rotor disk and the combustor assembly. The junctions between the hollow portion and the solid end portions of the inner shaft are shown to be parabolic on the forward end and conical on the aft end of the hollow portion. This shape produces the best results for keeping the critical speed above the operating speed for the inner shaft 51. In other embodiments, both junctions could be parabolic or both could be conical, or the forward junction could be conical while the aft junction could be parabolic. Also in other embodiments, the inner rotor shaft could be pressurized in order to increase the shaft's critical speed. In the structure disclosed for the inner rotor shaft of the present invention, the shaft could be pressurized to around 10,000 psi and the holes plugged by a weld or any other well known hole plugging process. The inner shaft ends extending from the hollow portion are disclosed as being solid. However, small diameter holes could be formed in one or both of the solid shaft ends to produce a substantially solid shaft end portion. Lubricating oil could be supplied to one or more of the bearings through the axial hole in the solid shaft end from an external source to the inner shaft.

The outer shaft 10 is shaped to fit over the inner shaft 51 with a minimal clearance to limit the size of the outer shaft 10. When assembled, the two rotor shafts 51 and 10 form a cooling air flow passage in the small space formed between the two shafts. Cooling air from the compressor outlet flows along the backside of the compressor rotor disk 31 and then through the radial holes 22 formed in the outer shaft 10, along the space formed between the two shafts, and out through the angled holes 42 formed in the turbine disk 32 and into the aft high pressure turbine rim cavity formed between the high pressure turbine blades and the second stage stator vanes as seen in FIG. 3. Hot gas flowing through the turbine can migrate into the rim cavity and flow into the aft bearings that support the two shafts. The cooling air that flows out from the turbine disk angled holes 42 will purge the hot gas from the aft high pressure turbine rim cavity and prevent it from entering the bearings.

The inner rotor shaft 51 assembly is now described. The forward solid end of the hollow inner shaft 51 is secured within the forward inner bearing housing 47 which abuts against the inner race of the forward inner rotor shaft bearing. The fan rotor disk is connected to the forward inner bearing housing 47 by one pin 56. The forward inner bearing housing 47 is connected to the inner rotor shaft 51 by one pin 57. The inner rotor shaft 51, the forward inner bearing housing 47, the inner race of the forward inner rotor shaft bearing, the fan rotor disk and the forward end nut 52 all rotate together. The aft end of the forward inner bearing housing 47 abuts against the annular abutment surface formed on the inner rotor shaft 51 near the end of the solid portion. With the forward end nut 52 tightened, a tensile preload is applied to the solid portion of the inner shaft 51 to prevent the assembly from becoming loose during engine operation.

A preload tensile force is also applied to the aft end of the inner shaft 51 on the solid portion. The solid portion of the aft end of the inner shaft 51 is connected to the aft inner bearing housing 48 which abuts up against the inner race of the inner rotor shaft bearing, and abuts against the low pressure turbine rotor disk and then the aft end nut 54. One pin 58 is used to secure the low pressure turbine rotor disk to the inner shaft 51 so these two parts rotate together. The forward end of the aft inner bearing housing 48 abuts against the annular abutment surface formed on the inner rotor shaft 51 near the end of the solid portion. With the aft end nut 54 tightened, a tensile preload is applied to the solid portion of the inner shaft 51 to prevent the assembly from becoming loose during engine operation. The parts under compression between the annular abutment surface on the solid portion of the inner shaft and the aft end nut 54 all rotate together with the inner shaft 51.

Each of the two inner bearing housings 47 and 48 include knife edges extending radially outward from the cylindrical section to form a seal against the inner surface of the cylindrical portion 46 on the forward end of the outer shaft 10 and against the axial extending portion 45 on the turbine rotor disk 32. The knife edge features on the inner bearing housing produce a slender cylindrical end on the inner shaft 51. The slender cylindrical ends will stretch more under assembly loads and produce a connection that will not loosen during engine operation. The high temperatures would expand the metal and loosen the nuts. Also, the rotation of the inner shaft 51 will cause the hollow section of the inner shaft to slightly bulge outward due to centrifugal forces. As the hollow section bulges outward, the solid shaft ends would contract inward and also tend to loosen the nuts. The tensile preload to the solid shaft ends prevents this loosening from occurring.

The low pressure turbine rotor disk is shaped to allow for the axial spacing between the bearings to be at a minimum in order to raise the critical speed of the inner shaft. The low pressure turbine rotor disk includes a cavity on the forward side of the disk with a diameter and a length to allow for the aft end low speed shaft bearing to be fully contained inside of the low pressure turbine rotor disk as seen in FIG. 3 and FIG. 4. A plurality of axial arranged holes are formed in the low pressure turbine rotor disk to allow cooling air passing through the bearings to exit the turbine. The low pressure turbine rotor disk is preferably a solid cast integrally blade rotor disk as is the high pressure turbine rotor disk. The aft bearings that support the inner shaft and the outer shaft are supported on an axial extending portion of the second stage guide vane assembly in which the aft end also fits within the cavity of the low pressure turbine rotor disk. The outer surface of the axial extending portion also includes knife edges to form a seal between the inner surface of the cavity on the low pressure turbine rotor disk.

Figure 5:
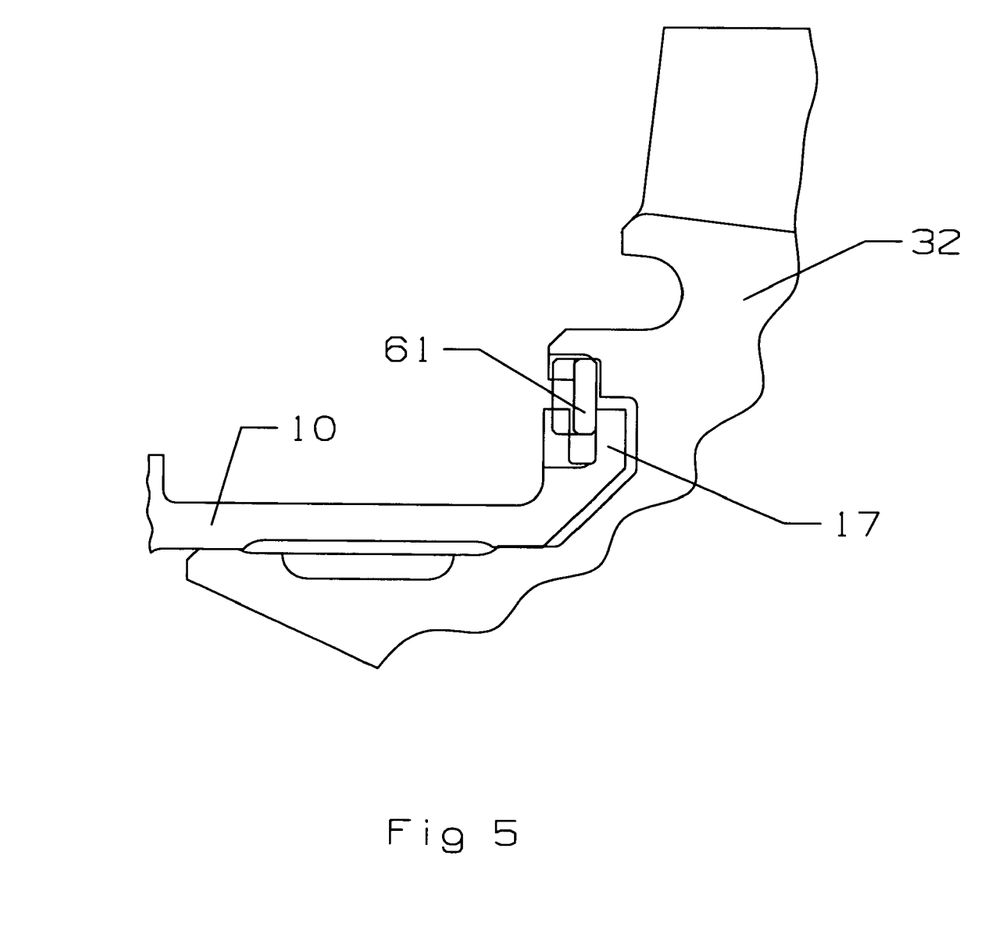
FIG. 5 shows a detailed view of the snap ring connection between the outer rotor shaft and the turbine rotor disk of the present invention.

FIG. 5 shows a close-up view of the retainer ring connection between the outer rotor shaft 10 and the high pressure turbine rotor disk 32. The rotor shaft 10 is fitted tightly over the rotor disk 32 in order to transfer torque. A retainer ring 61 is used to secure outer rotor shaft 10 to the high pressure turbine rotor disk 32. A snap ring (the retainer ring) 61 is used to rotatably secure the shaft to the rotor disk instead of a weld, bolts or other known shaft to rotor disk assembly means. Also, use of the snap ring eliminates the need for bolts that would add dead weight to the rotor disk 32 and therefore require added structure to support this addition weight. Because of the small size of the outer shaft 10 and turbine disk 32 of the present invention, there is not enough space to bolt the outer shaft 10 to the turbine disk 32. The snap ring 61 is used to ensure that the shaft and the rotor disk stay together axially. The tight fit described above between the shaft and the disk is the primary torque transmission device between the shaft and the rotor disk. The snap ring tabs function as a backup in case the tight fit interference slips.

Figure 6:
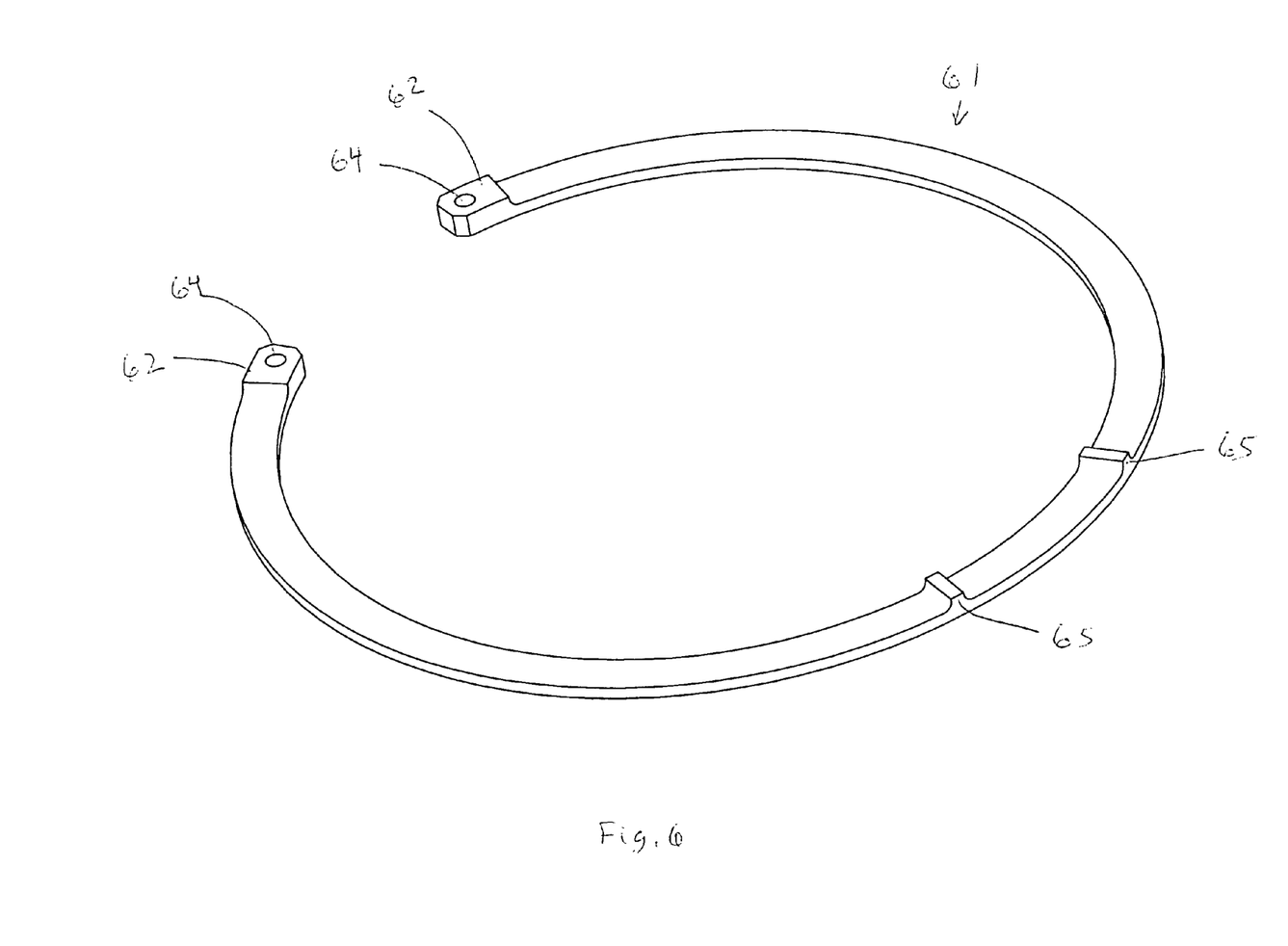
FIG. 6 shows a schematic view of the snap ring used to connect the outer shaft to the turbine rotor disk of the present invention.
Figure 7:
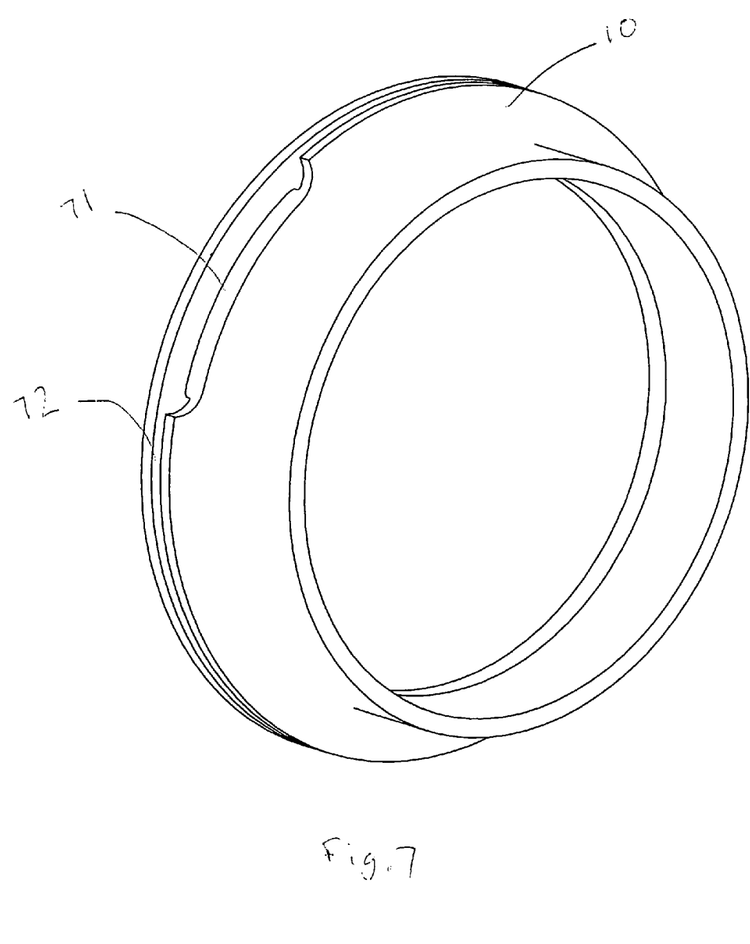
FIG. 7 shows a schematic view of the aft end of the outer rotor shaft with the annular groove that receives the retainer ring.
Figure 8:
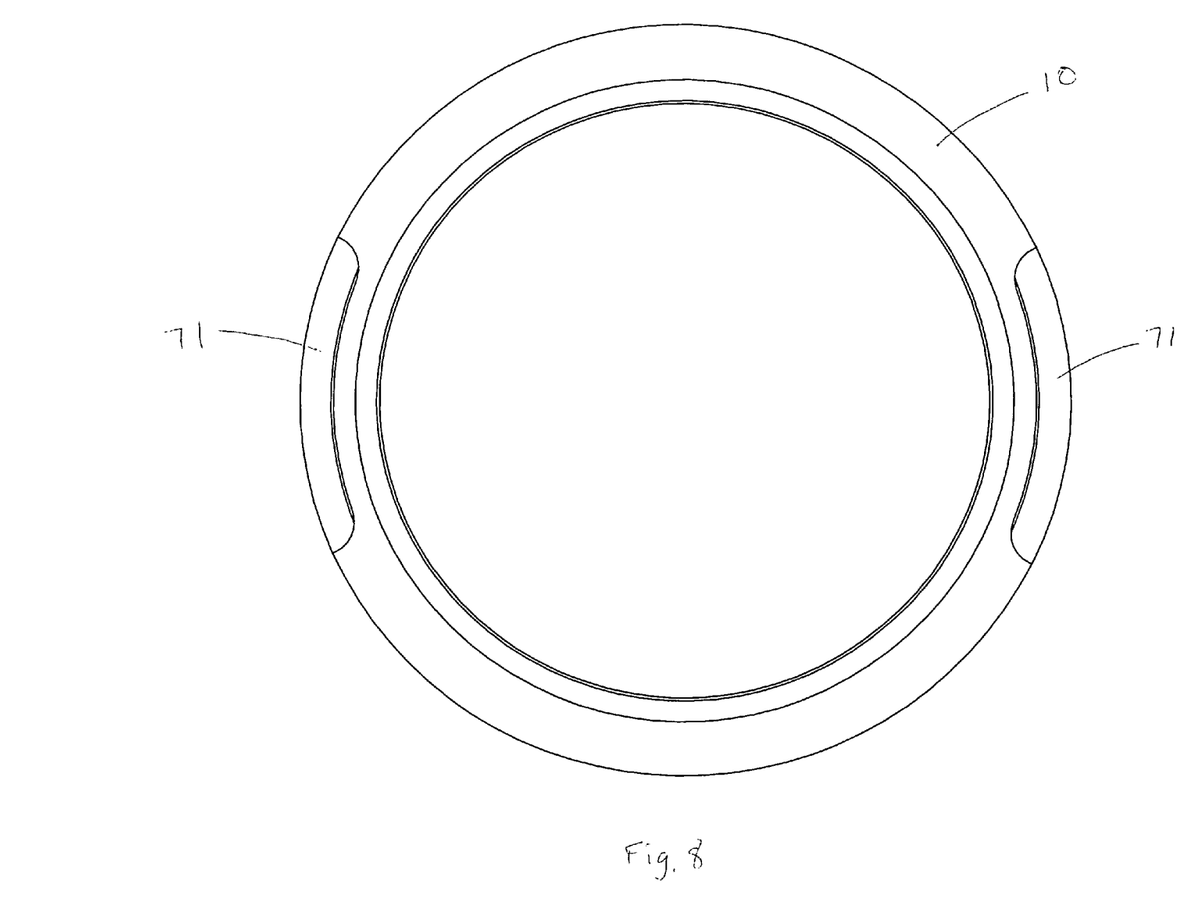
FIG. 8 shows the aft end of the outer rotor shaft looking down the rotational axis with the arc-shaped openings in the annular groove for insertion of the retainer ring.

FIG. 6 shows a schematic view of the retainer ring 61 and includes thicker ends or projections 62 each with a hole 64 to fit a tool used to contract the retainer ring 61 during installation and removal from the annular grooves formed in the shaft and disk. On opposite sides from the end projections 62 are two projections 65 that form abutments against arched openings 71 on the forward side of the annular groove 72 that are formed within the rotor shaft 10 and the rotor disk 32 to function as an anti-rotation feature for the ring in the groove. Both projections 62 and 65 of the snap ring 61 abut against the arched openings 71 in the rotor disk. FIG. 7 shows an isometric view of the aft end of the rotor shaft 10 with the annular groove 72 in which the retainer ring 61 fits. An arched opening 71 is formed on the forward wall that forms the annular groove 72 to allow for the retainer ring 61 to be placed within the annular groove 72. The rotor shaft 10 includes two of these arched openings 71 as seen from the FIG. 8 which looks along the rotational axis of the shaft. The arched openings 71 are offset at about 180 degrees from each other as seen in FIG. 8. The rotor disk 32 includes a similar sized and shaped annular groove with two opposed arched openings to fit the retainer ring 61. The edges of the projections 62 and 65 will abut against the ends of the arched openings 71 in order to prevent rotational displacement between the outer shaft 10 and the turbine rotor disk 31.

During installation of the retainer ring 61, the arched openings 71 on both the shaft and the disk are aligned with the retainer ring 61 inserted into one of the annular grooves. The retainer ring 61 is then pinched to decrease the diameter and then fitted into the other annular groove and released. The expanded retainer ring 61 will then be in the position shown in FIG. 5 and allow rotational transmission from the disk 32 to the shaft 10, or in other words prevent relative rotation between the shaft 10 and the disk 32.

The outer shaft 10 and the turbine rotor disk 32 are balanced separately before assembly. After assembly, the outer shaft 10 and turbine disk 32 assembly is rebalanced as an assembly and the two members are marked so that the shaft can be realigned with the rotor disk after disassembly to ensure that the reassembled rotor disk and shaft are balanced again.

Figure 9:
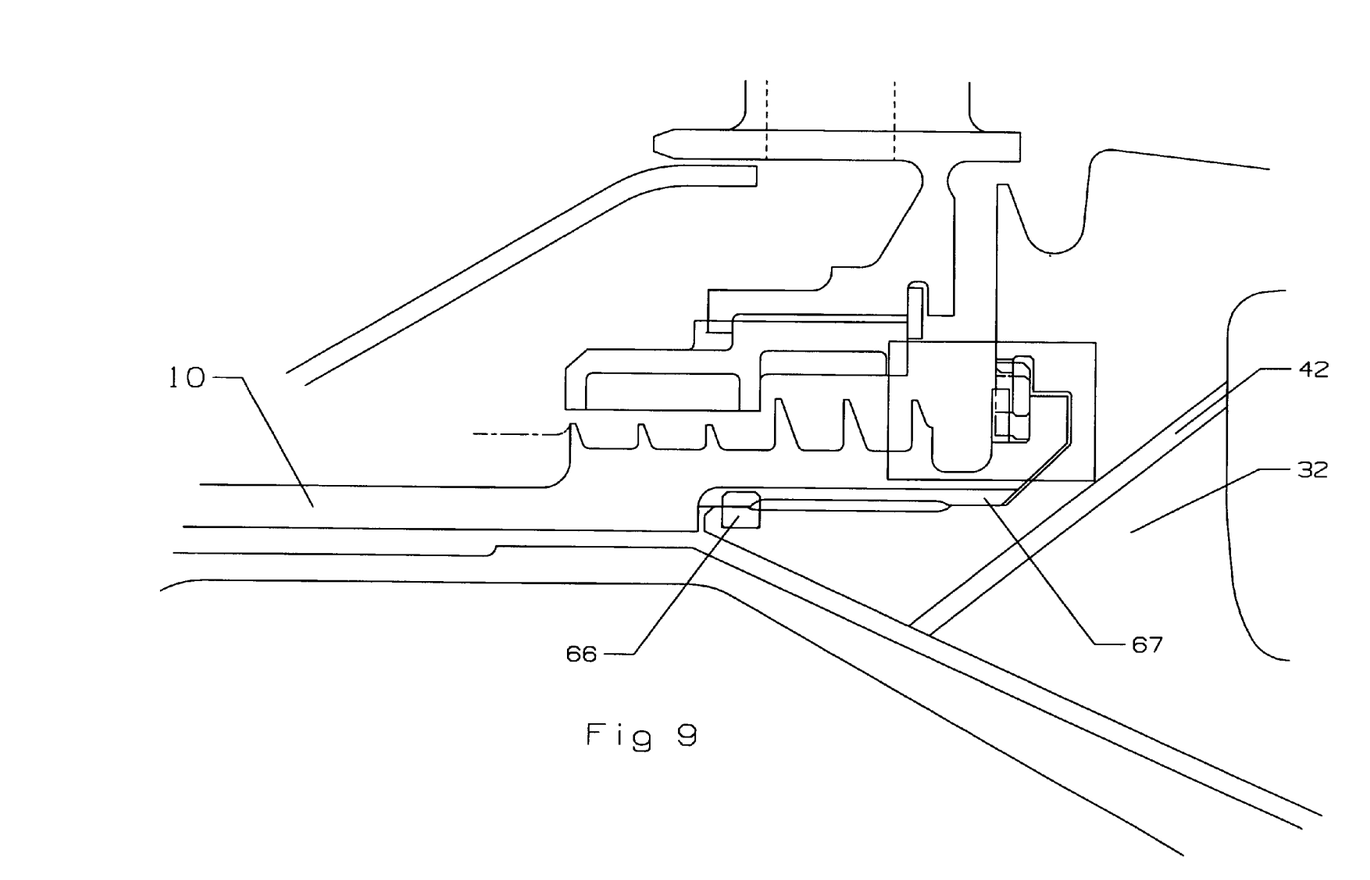
FIG. 9 shows a cross section view of a second embodiment of the outer rotor shaft connection to the high pressure turbine rotor disk of the present invention.

As an alternative to the shaft to rotor disk assembly disclosed in FIG. 5 above, a slot with an alignment pin 66 can be used to align the outer shaft 10 to the rotor disk 32 for assembly as shown in FIG. 9. An axial slot 67 for alignment is formed on the inner surface of the outer shaft 10 and the alignment pin 66 on the turbine rotor disk 32 will be used to align these two members. In this embodiment, one or two snap rings (retainer rings) could be used instead of the one in the first embodiment. A tight fit between the outer shaft 10 and the rotor disk 32 is also used in the FIG. 9 embodiment along with the alignment pin 66 and the axial slot 67.

The twin spool rotor shaft assembly of the present invention is shown to have the outer shaft with the larger diameter opening on the aft end and connected to the turbine rotor disk by the snap ring. It is theoretically possible that the outer shaft could be reversed such that the larger diameter opening—in which the inner rotor shaft is inserted during assembly—could be located on the forward end of the outer shaft, and the outer shaft could be connected to the compressor rotor disk by the snap ring assembly. However, the compressor rotor disk would have to be significantly modified in its present structure and may not produce a working engine. The combustor assembly requires that the outer rotor shaft pass under the aft inner opening of the compressor rotor disk the combustor assembly has a larger inner diameter than does the compressor rotor disk, and therefore the hollow inner shaft can have a larger diameter within the annular combustor than within the compressor rotor disk.

I claim the following:

1. A hollow rotor shaft for a small twin spool gas turbine engine, the hollow rotor shaft comprising:
   a hollow portion having a forward end and an aft end;
   a substantially solid shaft end extending from one of the ends of the hollow rotor shaft;
   an inner bearing housing rotatably secured to the outer surface of the solid shaft end and abutting against a portion of the hollow rotor shaft; and,
   a nut threaded to the substantially solid shaft end to apply a compression to the inner bearing housing and a tension to the substantially solid shaft end.

2. The hollow rotor shaft of claim 1, and further comprising:
   the inner bearing housing including an annular flange forming an abutment surface for a bearing inner race;
   a bearing mounted on an outer surface of the inner bearing housing;
   a rotor disk rotatably secured to the inner bearing housing;
   a nut threaded onto a forward end of the solid shaft end; and,
   the preload tension force is applied through the nut to the rotor disk, into the inner race of the bearing, against the annular flange of the inner bearing housing, and onto the hollow rotor shaft.

3. The hollow rotor shaft of claim 1, and further comprising:
   a substantially solid shaft end extending from the forward end and the aft end of the hollow rotor shaft;
   a forward and an aft inner bearing housing rotatably secured to the outer surface of the substantially solid shaft ends and abutting against a portion of the hollow rotor shaft; and,
   a nut threaded to each of the two substantially solid shaft ends to apply a compression to the inner bearing housing and a tension to the substantially solid shaft end.

4. A twin spool rotor shaft assembly for a small gas turbine engine, the shaft assembly comprising:
   an outer rotor shaft having one end with a cylindrical extending portion having an opening to receive an inner rotor shaft end;
   the cylindrical extending portion having an outer surface that forms a bearing support surface;
   an inner rotor shaft having a hollow middle portion and a substantially solid end portion extending from the hollow middle portion, the substantially solid end portion extending through the cylindrical extending portion of the outer rotor shaft;
   an inner bearing housing rotatably secured to the substantially solid end portion of the inner rotor shaft, the inner bearing housing abutting against an annular abutment surface formed on the inner rotor shaft; and,
   means to apply a compression preload to the inner bearing housing and a tension preload to the substantially solid end portion of the inner rotor shaft such that the bearing assembly does not become loose during the engine operation.

5. The twin spool rotor shaft assembly of claim 4, and further comprising:
   the inner bearing housing includes a cylindrical extending portion and an annular flange on the outer end;
   a bearing arranged to rotatably support the end of the inner rotor shaft; and, the inner race of the bearing transmitting the compression preload to the annular flange of the inner bearing housing.

6. The twin spool rotor shaft assembly of claim 5, and further comprising:
knife edge sealing means formed on the outer surface of the cylindrical extending portion on the inner bearing housing.

7. The twin spool rotor shaft assembly of claim 5, and further comprising:
a rotor disk rotatably secured to the inner rotor shaft; and,
the rotor disk transmitting the compression preload to the inner race of the bearing.

8. The twin spool rotor shaft assembly of claim 7, and further comprising:
a nut threaded onto the end of the inner rotor shaft; and,
the nut transmitting the compression preload to the rotor disk.

9. The twin spool rotor shaft assembly of claim 7, and further comprising:
the rotor disk is a fan blade rotor disk on the forward end of the inner rotor shaft.

10. The twin spool rotor shaft assembly of claim 7, and further comprising:
the rotor disk is a low pressure turbine rotor disk on the aft end of the inner rotor shaft.

11. The twin spool rotor shaft assembly of claim 4, and further comprising:
a high pressure compressor rotor disk rotatably secured to the outer rotor shaft;
the high pressure compressor rotor disk having a bearing race abutment surface on the outer end of the disk;
an outer rotor shaft bearing secured to the bearing support surface on the cylindrical extending portion on the outer rotor shaft; and,
a nut threaded onto an outer end of the cylindrical extending portion to compress the bearing inner race against the bearing race abutment surface of the high pressure compressor rotor disk.

12. The twin spool rotor shaft assembly of claim 4, and further comprising:
a high pressure turbine rotor disk rotatably secured to the outer rotor shaft;
the turbine rotor disk having an axial extending portion with an outer surface forming a bearing support surface; and,
a nut threaded onto the axial extending portion to compress the inner race of the bearing against the turbine rotor disk.

13. The twin spool rotor shaft assembly of claim 4, and further comprising:
the means to apply a compression preload to the inner bearing housing and a tension preload to the substantially solid end portion of the inner rotor shaft includes:
an annular flange on the outer end of the inner bearing housing;
an inner race of an inner rotor shaft bearing;
a low pressure fan rotor disk; and,
a threaded nut threaded onto the end of the inner rotor shaft.

14. The twin spool rotor shaft assembly of claim 4, and further comprising:
the means to apply a compression preload to the inner bearing housing and a tension preload to the substantially solid end portion of the inner rotor shaft includes:
an annular flange on the outer end of the inner bearing housing;
an inner race of an inner rotor shaft bearing;
a low pressure turbine rotor disk; and,
a threaded nut threaded onto the end of the inner rotor shaft.

* * * * *